(12) United States Patent
Matsumoto et al.

(10) Patent No.: US 6,716,528 B1
(45) Date of Patent: Apr. 6, 2004

(54) MECHANICAL SEAL MEMBER

(75) Inventors: Takashi Matsumoto, Kagawa (JP); Toshiomi Fukuda, Kagawa (JP); Shin-ichi Ozaki, Kagawa (JP); Yuji Takimoto, Kagawa (JP)

(73) Assignee: Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 09/786,347

(22) PCT Filed: Sep. 13, 1999

(86) PCT No.: PCT/JP99/04965
§ 371 (c)(1),
(2), (4) Date: Mar. 29, 2001

(87) PCT Pub. No.: WO00/15982
PCT Pub. Date: Mar. 23, 2000

(30) Foreign Application Priority Data

Sep. 11, 1998 (JP) .............................. 10-276664

(51) Int. Cl.⁷ ................................. B32B 9/00
(52) U.S. Cl. ...................... 428/408; 428/446; 428/688; 428/698
(58) Field of Search ................ 428/408, 446, 428/688, 698

(56) References Cited

FOREIGN PATENT DOCUMENTS

| JP | 07-144982 | * | 6/1995 |
| JP | 8-109083 | | 4/1996 |
| JP | 9-132478 | | 5/1997 |
| JP | 10-251063 | | 9/1998 |

* cited by examiner

Primary Examiner—Deborah Jones
Assistant Examiner—Abraham Bahta
(74) Attorney, Agent, or Firm—Oblon, Spivak, McClelland, Maier & Neustadt, P.C.

(57) ABSTRACT

A mechanical seal member formed by applying slurry, in which boron carbide powder and silicon powder are mixed and dispersed onto the entire surface of a carbon material having an average pore radius of at least 1.0 $\mu$m and formed into a hollow tubular or cylindrical product shape and firing the resultant product to form a carbon-silicon carbide composite material extending from the entire surface toward the interior of the product shape and a thin coating, 3 to 30 $\mu$m thick, consisting mainly of silicon carbide and boron carbide and spread on the surface of the composite material. The carbon-silicon carbide composite material is formed uniformly from the surface to the center, because the member is small in size with a section, parallel to the center axis, of up to 7×7 mm. A siliconization ratio on the surface of the composite material is 30 to 55% in area ratio. A carbon base material density is at least 1.7 g/cm³ and after siliconization 2.0 to 2.5 g/cm³. A mechanical seal member may be produced by impregnating metal or resin into pores of this carbon-silicon composite material.

13 Claims, 3 Drawing Sheets for small mechanical seal
cross-section part
white spots: SiC
black spots: C
×20 magnifications

Fig. 3

|  | carbon | silicon compound | others |
|---|---|---|---|
| wt.% | 54 | 38 | 7.6 |

Fig. 4

|  | bulk density of substrate | substrate fine pore radius | surface area ratio | | bulk density after siliconization | wear degree after 100 h testing μm | |
|---|---|---|---|---|---|---|---|
|  | g/cm³ | μm | SIC | C | g/cm³ | counterpart material | test specimen |
| test example 1 | 1.85 | 1.0 | 30 | 70 | 2.05 | 2 | 1 |
| test example 2 | 1.82 | 1.2 | 35 | 65 | 2.18 | 1 | 1 |
| test example 3 | 1.70 | 2.0 | 55 | 45 | 2.40 | 5 | 2 |

MECHANICAL SEAL MEMBER

BACKGROUND OF THE INVENTION

1. Field of the Invention

The present invention relates to a mechanical seal member excellent in wear resistance and penetration resistance, capable of stably maintaining a slide sealing effect for a long duration, and usable for a widely employed pump for a refrigerator, an automotive water pump, and the like.

2. Description of the Prior Art

In the recent years, while a graphitic carbon material has widely been used as a mass production type and miniaturized mechanical seal member for a widely usable pump for such as a refrigerator, an automotive water pump, and the like, it is required to further improve the characteristics such as a higher slurry resistance, a higher peripheral speed, a longer life, a higher blister resistance, and so forth.

Hence, as a material to satisfy these requirements, Japanese Patent Application Laid-Open No. Hei 10(1998)-53480 has disclosed a technique of providing a mechanical seal member by applying a silicon paste to the surface layer including a sliding face of a carbon substrate and conversing the silicon paste into a silicon carbide-based substance.

However, silicon is difficult to penetrate carbon if the pore radius is 1 $\mu$m or smaller. For that, even if penetration takes place owing to capillarity, it is limited and reaches at deepest about 1 to 2 mm and therefore the thickness of a carbon-silicon carbide composite layer formed by thermal treatment is at thickest about 2 mm. Further, there occurs a problem that the penetration in the inside is not even and that the thickness of the formed carbon-silicon carbide composite layer is uneven.

Therefore, since the thickness of the formed composite layer partly differs, a product is sometimes strained owing to the partial difference of the thermal expansion coefficient of the layer from that of the carbon substrate to make it necessary to subject the product to machining to a proper product size after the carbon-silicon carbide composite layer formation.

SUMMARY OF THE INVENTION

The purpose of the present invention is to provide a mechanical seal member for a small size and widely usable pump which is excellent in slide sealing property, blister resistance, and machining to a product size aside from last abrasion processing of a sliding respect becoming unnecessary by evenly forming a carbon-silicon carbide composite layer deep from the surface and on the whole face of the product.

A mechanical seal member relevant to the present invention is provided with a carbon-silicon carbide composite layer in the whole surface by providing some catalytic function or other by adding boron carbide in order to achieve the foregoing purpose. That is a slurry containing a boron carbide powder and a silicon powder mixed and dispersed therein is applied to the whole surface of a carbon material processed to have a product shape by machining a hollow tubular or cylindrical carbon material having pores with 1.0 $\mu$m larger average fine pore radius and the applied slurry is fired to form a carbon-silicon carbide composite substance in the whole surface area of the foregoing carbon material with a product shape toward inner side and to form a thin coating of 3 to 30 $\mu$m containing silicon carbide and boron carbide as main components in the surface to obtain a mechanical seal member. Further, since the mechanical seal member is not larger than 7×7 mm in cross-section surface area parallel to the center axis, the carbon-silicon carbide composite substance is approximately evenly formed toward inside from the surface in the depth direction and the carbon-silicon carbide composite substance reaches approximately the center part of the foregoing cross-section. The siliconizing ratio of the surface of the carbon-silicon carbide composite material is 30 to 55% by surface area. The density of the carbon substrate to be used is 1.7 g/cm$^3$ or higher and the density after siliconization is 2.0 to 2.5 g/cm$^3$. Further, the pores of the carbon-silicon carbide composite material may be impregnated with a metal or a resin to be a mechanical seal member.

BRIEF DESCRIPTION OF THE DRAWINGS

FIG. 3 is a table showing the approximate ratio of the constituent components of the surface of the sliding face.

FIG. 4 is a table showing the results of a wear resistance test.

DESCRIPTION OF THE INVENTION

Figure 1:
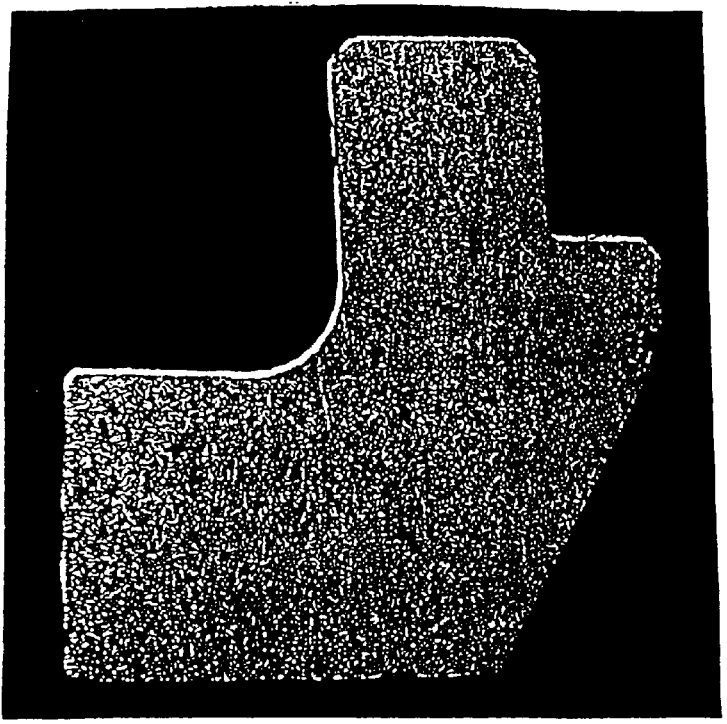
FIG. 1 is a picture of the cross-section of a mechanical seal member of a carbon-silicon carbide composite material produced by adding boron carbide.

Addition of boron carbide provides some catalytic function or other to make silicon penetrate a carbon substrate deep inside and reach deep in depth from the surface. For that, in the case where the cross-section surface area is about that of a widely used type and small size mechanical seal member, a carbon-silicon carbide composite material can be formed evenly in the sufficiently deep inside. The part where silicon carbide is formed is provided with a high hardness, that is, a wear resistance, as compared with a carbon substrate and the silicon carbide part is, though slightly, made projected and the slide face roughness is heightened to involve an object fluid subjected to sealing at the time of sliding to keep the fluid lubricating state. Further, the silicon carbide with projected shape, occupying 30 to 55% surface area ratio, and having high wear resistance can closely be attached to the counterpart member to retain the sealing property and enables such a mechanical seal to be used in any conditions in which a conventional mechanical seal member made of graphite has been employed.

Moreover, even the carbon-silicon carbide composite material is not warped and kept the size and the shape of them by siliconaized after processing to form a final shape, because of the siliconization ratio of the carbon-silicon carbide composite material from the surface to the inside is approximately even and the silicon carbide is formed on the whole surface. Further, the mechanical strength can be improved. Since a carbon substrate originally having a high density not lower than 1.7 g/cm$^3$ and in general, so-called a high density and high strength carbon material, is used, the obtained material is therefore provided with strength sufficiently high for a mechanical seal member.

After the siliconizing treatment, a hard coating of 3 to 20 $\mu$m thickness remains on the surface and it is easy to be removed. Further owing to the extremely thin thickness, 3 to 20 $\mu$m, the coating scarcely affects the product size and thus it is no need to be removed. Further, to leave the thin film of mainly silicon carbide and boron carbide on the surface as it is consequently makes mechanical processing no need to form an obtained carbon material to a final product size after the siliconizing treatment. Due to that, before the alteration treatment into silicon carbide is carried out, a carbon substrate is previously and automatically processed to a prescribed product size and shape in this stage. That is as same as the processing of a conventional mechanical seal member of a graphitic carbon material and since a full-automated machine tool capable of operating around the clock, such an NC lathe or the like, can be employed, the time and the cost required to carry out the mechanical processing can remarkable be saved as compared with those for producing a conventional carbon-silicon carbide composite material by a CVD method. The final mechanical processing mentioned in this case means mechanical processing except specularly polishing process of the slide face.

The impenetrability is made further reliable by impregnating the obtained mechanical seal member with a metal or a resin to make the mechanical seal member usable for a mechanical seal member even for sealing a fluid at a high pressure, with a low viscosity and easy to be gasified.

The prescribed alteration ratio, 30 to 55%, to silicon carbide can be achieved if the average pore radius measured by mercury pressure process is 1.0 $\mu$m or larger and preferably 2.0 $\mu$m or smaller. The face subjected to siliconizing is dependent on the average fine pore radius and also depend on the fine pore distribution in the surface of the carbon substrate, that is, the density of the carbon substrate and the density is therefore required to be 1.7 g/cm$^3$ or higher. Further, if the average fine pore radius is 1.0 $\mu$m or smaller, metal silicon cannot penetrate the carbon material deep inside and the prescribed alteration ratio, 30 to 55%, into silicon carbide cannot be achieved. In the case where the density after the siliconizing treatment is 2.0 to 2.5 g/cm$^3$, especially preferably 2.1 g/cm$^3$ or higher, the alteration ratio of the inside into silicon carbide is confirmed to be 30 to 55%.

The mechanical seal member of the present invention is produced as follows. At first, a carbon substrate is processed to be a final shape of a mechanical seal. To process the carbon substrate, processing is carried out by a full-automated machine tool such as a NC lathe or the like as same in the case of a conventional mass production type carbonaceous mechanical seal and then a slurry to be formed into a silicon carbide layer is applied to the whole surface area. The slurry is produced by mixing and dispersing a silicon powder of about 30 to 50 $\mu$m average particle size, a boron carbide powder of about 4 to 20 $\mu$m average particle size, and a resin. The resin to be used generally has an excellent film formability and leaves carbon residue at a low ratio and is preferably selected from polyamideimides, poly(vinyl alcohol), and polyamide resins. Among them, polyamideimides are further preferable and used while being dissolved in a solvent such as dimethylacetamide, dimethylformamide, dimethylsulfoxide, N-methyl-2-pyrrolidone, and the like.

When a silicon powder and a boron carbide powder are mixed in a resin, it is preferable to control the ratio of the boron carbide powder to the silicon powder to be 5 to 50 wt. % to 50 to 95 wt. %. The ratio is further preferable to be 20 wt. % of the boron carbide powder to 80 wt. % of the silicon powder. That is because if the ratio of the boron carbide is less than 5 wt. %, the effect of addition of the boron carbide powder is low. Practically, that is because in the case of treatment in a vacuum furnace at a high temperature, melted Si does not completely penetrate pores of graphite and remains on the surface of the graphite while adhering to the surface as a metal Si after cooling and because the solid matter is extremely difficult to be removed. On the other hand, in the case where 5 wt. % or more of a boron carbide powder is added, the addition causes an effect as a catalyst. That is, a reaction of silicon and carbon is promoted and siliconizing to silicon carbide proceeds to improve wettability to silicon and it is supposedly attributed to that silicon penetrates pores of carbon in deep and reaction with carbon is promoted to produce silicon carbide and to form a silicon carbide layer. In other words, boron carbide provides some catalytic function or other to promote the reaction of silicon with carbon and such an effect is caused in the case where at least 5 wt. % or more of a boron carbide powder is added and a silicon carbide layer can be formed evenly from the surface toward the inside.

A carbon substrate processed for a small type mechanical seal is immersed in or coated to the whole surface area with a slurry produced in the manner as described above. After that, drying at about 300° C. is carried out for 2 hours to evaporate a solvent and completely harder the resin. Then, the resultant carbon substrate is subjected to high temperature thermal treatment in an inert gas atmosphere of 10 Torr or lower. The temperature increase rate is about 400° C./hour and when the temperature reaches about 1,550 to 1,600° C., the substrate is kept at the temperature for 30 minutes. A heating means is not specifically limited and a proper means can be employed. By such treatment, the silicon component is melted, passes the carbonized layer of the resin, penetrates as to fill the fine pores of the carbon substrate in the depth as deep as 2 mm from the surface or deeper and causes a reaction with carbon to be silicon carbide. Consequently, silicon carbide is formed in the fine pores and the fine pores of the carbon substrate are filled with silicon carbide and siliconization occurs in 30 to 55% of the carbon substrate to improve the impenetrability of the substrate to a fluid such as a gas and a liquid.

After that, in order to remove boron carbide, silicon carbide, metal silicon or the like remaining on the surface, the resultant carbon substrate is kneaded with sand or the like. Then, in order to make the impenetrability reliable, the substrate is impregnated with a metal or a thermosetting resin to give a final product.

In such a manner, since the silicon carbide layer is formed on the whole body of a product, strain owing to residual stress generated at the time of conversion to silicon carbide is scarcely caused and mechanical processing as post-treatment is made no need even if the silicon carbide conversion is carried out after a carbon substrate is processed to a product shape. Further, no residue as metal silicon remains on the surface of the graphite and although residues of such as carbides of used resin, silicon carbide, and boron carbide remain on the surface, they can easily be removed and do not any problem. The boron carbide added is also supposed to be effective to improve the covalent bond degree of the silicon carbide and to improve the surface hardness, that is, the wear resistance. Further, mechanical processing can full-automatically be carried out in a stage as a carbon substrate prior to the alteration treatment to silicon carbide and final mechanical processing except precision processing such as polishing treatment for the sliding face is made no need, so that the production cost can significantly be lowered and the production time can remarkably be shortened as compared with those for producing a conventional carbon-silicon carbide composite material.

BEST MODE FOR CARRYING OUT THE INVENTION

The present invention will be described in detail according to an example below.

Example 1

As a carbon substrate, an isotropic graphite (produced by Toyo Tanso Co., Ltd.) of 1.77 g/cm$^3$ density, 1.5 μm average fine pore radius, and 400 kgf/cm$^2$ bending strength was processed to be a small type mechanical seal product shape of 0.3 cm$^2$ cross-section surface area. The value employed as the average fine pore radius was a value measured by mercury pressure process (the half value of the cumulative fine pore volume at 141.3° of the contact angle between the specimen and mercury and 1,000 kg/cm$^3$ of the maximum pressure). A silicon powder (produced by Wako Pure Chemical Industries Ltd., with 40 μm average particle size) and a boron carbide powder (produced by Denki Kagaku Kogyo K.K., type of AFI and with 5 μm average particle size) were kneaded at 80:20 ratio by weight and a 8% poly(vinyl alcohol) solution was added as a dispersant and the resultant mixture was mixed and dispersed to obtain a slurry. Test specimens were immersed in the obtained slurry, kept for 1 hour at a normal temperature, dried in a drying apparatus to evaporate the dispersant at 80 to 200° C. and further, heated to 1,800° C. within 5 hours in nitrogen gas atmosphere of 10 Torr in an induction heating furnace, kept for 30 minutes in the furnace, and then cooled and taken out of the furnace. The residue remaining on the surface was removed after cooling. Next, the density and the siliconization ratio of the surface were measured. The siliconization ratio of the surface of the sliding face was measured by taking a secondary electron image by a scanning electron spectroscopy (S-2400, produced by Hitachi Ltd.) and then the surface area ratio of SiC/graphite (C) was measured at two points by an image analyzing apparatus (IBAS, produced by Carl Zeiss) and the average of these measured value was employed as the surface area ratio. Further, constituent elements of the surface of the sliding face part were qualitatively analyzed by wide scanning using ESCA (SSX-100 Model 206, produced by Surface Science Instruments).

Comparative Example 1

The same carbon substrate as that of the example 1 was used. Using only a silicon powder, a slurry was produced in the same manner as the example 1 by adding a 8% poly(vinyl alcohol) solution and mixing and dispersing the silicon powder. Test specimens were immersed in the slurry, kept at a normal temperature for about 1 hour, dried at 80 to 200° C. in a drying apparatus to evaporate the solvent, heated to 1,800° C. in 5 hours in an induction heating furnace in nitrogen gas atmosphere of 10 Torr, kept for 30 minutes in the furnace, and then cooled and taken out of the furnace. After the cooling, the residue remaining on the surface was removed. Finally the cross-sections of the specimens were observed.

FIG. 1 shows the whole cross-section of a mechanical seal member relevant to the present invention produced by adding boron carbide. The white parts in the figure indicate silicon parts and the black parts indicate carbon parts. Siliconization was found evenly taking place in the inside. The siliconization ratio was 38% and the density was 2.18 g/cm$^3$.

Figure 2:
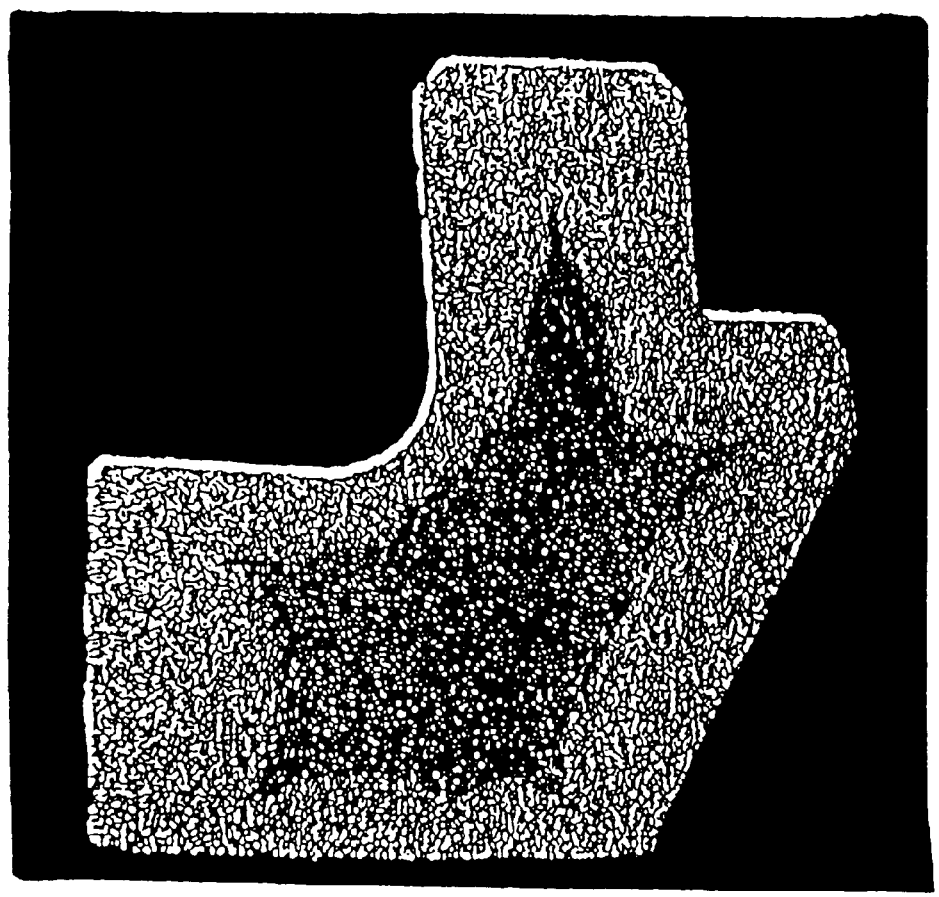
FIG. 2 is a picture of the cross-section of a mechanical seal member of a carbon-silicon carbide composite material produced by using only silicon.

FIG. 2 shows the whole cross-section of a mechanical seal member in which silicon carbide was formed using only silicon. The white parts in the figure indicate silicon parts and the black parts indicate carbon parts. Different from FIG. 1, it was found that silicon did not penetrate evenly the inside and siliconization unevenly took place.

FIG. 3 shows the approximate ratios of the constituent components of the surface of a sliding face. According to the results, the siliconization ratio was 38% and found that it was approximately the same as the surface area ratio shown in FIG. 1.

Wear Resistance Test

Specimens with 30%, 35%, and 55% of siliconization ratio were produced for a wear resistance test and a sliding test was carried out. The sliding test, was carried out by fixing a test specimen in a stainless steel metal tool, specularly polishing the sliding test face, and carrying out a wear resistance test for a mechanical seal member in the following conditions:

the plane pressure 0.196 MPa;
the average circumferential speed 7,000 rpm;
a fluid water (80° C.);
and testing duration 100 hours.

Test Example 1

As a carbon substrate, an isotropic graphite (produced by Toyo Tanso Co., Ltd.) of 1.85 g/cm$^3$ density, 1.0 μm average fine pore radius, and 800 kgf/cm$^2$ bending strength was processed for testing in the same manner as the example 1 to be a small type mechanical seal product shape of 0.3 cm$^2$ cross-section surface area. Through the same procedure as the example 1, a silicon powder (produced by Wako Pure Chemical Industries Ltd., with 40 μm average particle size) and a boron carbide powder (produced by Denki Kagaku Kogyo K.K., type of AFI and with 5 μm average particle size) were mixed at 80:20 ratio by weight and a 8% poly(vinyl alcohol) solution was added as a dispersant and the resultant mixture was mixed and dispersed to obtain a slurry. Test specimens were immersed in the obtained slurry, kept for about 1 hour at a normal temperature, dried in a drying apparatus to evaporate the dispersant at 80 to 200° C. and further, heated to 1,800° C. within 5 hours in nitrogen gas atmosphere of 10 Torr in an induction heating furnace, kept for 30 minutes in the furnace, and then cooled and taken out of the furnace. The residue remaining on the surface was removed after cooling. Next, the density and the siliconization ratio of the surface were measured in the same manner as the example 1. The siliconization ratio was 30% and the density was 2.15 g/cm$^3$.

Then, for the purpose of impenetrability treatment, the test specimens were put in an impregnation apparatus and pressurized by injecting a phenol resin at 20 kg/cm$^2$ pressures continuously for 2 hours. After the impregnation, the resultant specimens were put in a drying apparatus and heated from a normal temperature to 200° C. to harder the resin.

Test Example 2

As a carbon substrate, an isotropic graphite (produced by Toyo Tanso Co., Ltd.) of 1.82 g/cm$^3$ density, 1.2 μm average fine pore radius, and 780 kgf/cm$^2$ bending strength was employed to produce small size mechanical seals of a carbon-silicon carbide composite material for testing in the same manner as the example 1. The siliconization ratio was 38% and the density was 2.18 g/cm$^3$. After that, specimens for the test were produced by impregnating the mechanical seal specimens with a phenol resin in the same manner as the test example 2.

Test Example 3

As a carbon substrate, an isotropic graphite (produced by Toyo Tanso Co., Ltd.) of 1.70 g/cm$^3$ density, 2.0 μm average fine pore radius, and 370 kgf/cm² bending strength was employed to produce small size mechanical seals of a carbon-silicon carbide composite material for testing in the same manner as the example 1. The siliconization ratio was 55% and the density was 2.40 g/cm³. After that, specimens for the test were produced by impregnating the mechanical seal specimens with antimony.

The results of the wear resistance test are shown in FIG. 4.

According to the results shown in FIG. 3, it can be said that the carbon-silicon carbide composite material relevant to the present invention and produced approximately evenly even in the inside by siliconization at 30 to 555% ratio is sufficiently provided with a capability as a mechanical seal member.

Industrial Applicability

The mechanical seal member according to the present invention can provide a slide sealing effect more excellent than that of a conventionally used mechanical seal member made of graphite even in conditions of a low rotation speed and a high pressure and at the same time, being a substrate, the substrate can previously be processed to a final product shape by mechanical processing to lower the production cost. In the case of mass production, this mechanical seal member can be produced economically without much difference from a conventional mechanical seal member made of graphite and thus a mechanical seal member for a small type and widely used pump can significantly economically and easily be provided.

What is claimed is:

1. A mechanical seal member, comprising
   a carbon substrate having a pre-formed final product shape having a cross-section of equal to or less than 7×7 mm;
   a carbon-silicon carbide composite material on the whole surface of the substrate and toward the depth direction uniformly by applying a slurry comprising from 95 to 50 weight % of boron carbide powder, from 5 to 50 weight % a silicon powder, and a resin, and by firing the resultant carbon material at 1550° C. or higher; and
   a thin film formed on a surface of the carbon-silicon carbide composite material comprising a silicon carbide and boron carbide wherein the thin film has a thickness of from 3 to 20 μm.

2. The mechanical seal member according to claim 1, wherein the carbon substrate having a final product shape is produced by cutting a hollow tubular or cylindrical shape by machining.

3. The mechanical seal member according to claim 1, wherein a siliconization ratio of the surface of the carbon-silicon carbide composite material is from 30 to 55% by surface area ratio.

4. The mechanical seal member according to claim 1, wherein the carbon substrate has a density of 1.7 g/cm³ or higher prior to siliconization.

5. The mechanical seal member according to claim 1, wherein the carbon substrate has a density of from 2.0 to 2.5 g/cm³ after siliconization.

6. The mechanical seal member according to claim 1, wherein the carbon-silicon carbide composite material comprises pores that are impregnated with at least one selected from the group consisting of a metal and resin.

7. A method of producing a mechanical seal member, according to claim 1 comprising
   pre-forming a carbon material into a final product shape;
   applying a slurry comprising
      boron carbide powder,
      silicon powder,
      and a resin; to the carbon material so that the slurry forms a thin film of carbon-silicon carbide composite material on a surface of the carbon material wherein the thin film has a thickness of from 3 to 20 μm.

8. The method according to claim 7, wherein the carbon material has fine pores of 1.0 μm or larger average fine pore radius.

9. The method according to claim 7, further comprising drying the carbon material after applying the slurry.

10. The method according to claim 7, further comprising firing the carbon material after applying the slurry.

11. The method according to claim 10, wherein the firing of the carbon material is at a temperature of from 1550° C. to 1600° C.

12. A mechanical seal member made by the process according to claim 7.

13. A mechanical seal member, comprising
    a carbon substrate having a pre-formed final product shape having a cross-section of equal to or less than 7×7 mm;
    a carbon-silicon carbide composite material on the whole surface of the substrate and toward the depth direction uniformly; and
    a thin film formed on a surface of the carbon-silicon carbide composite material comprising a silicon carbide and boron carbide wherein the thin film has a thickness of from 3 to 20 μm.

* * * * *